Figure 1:
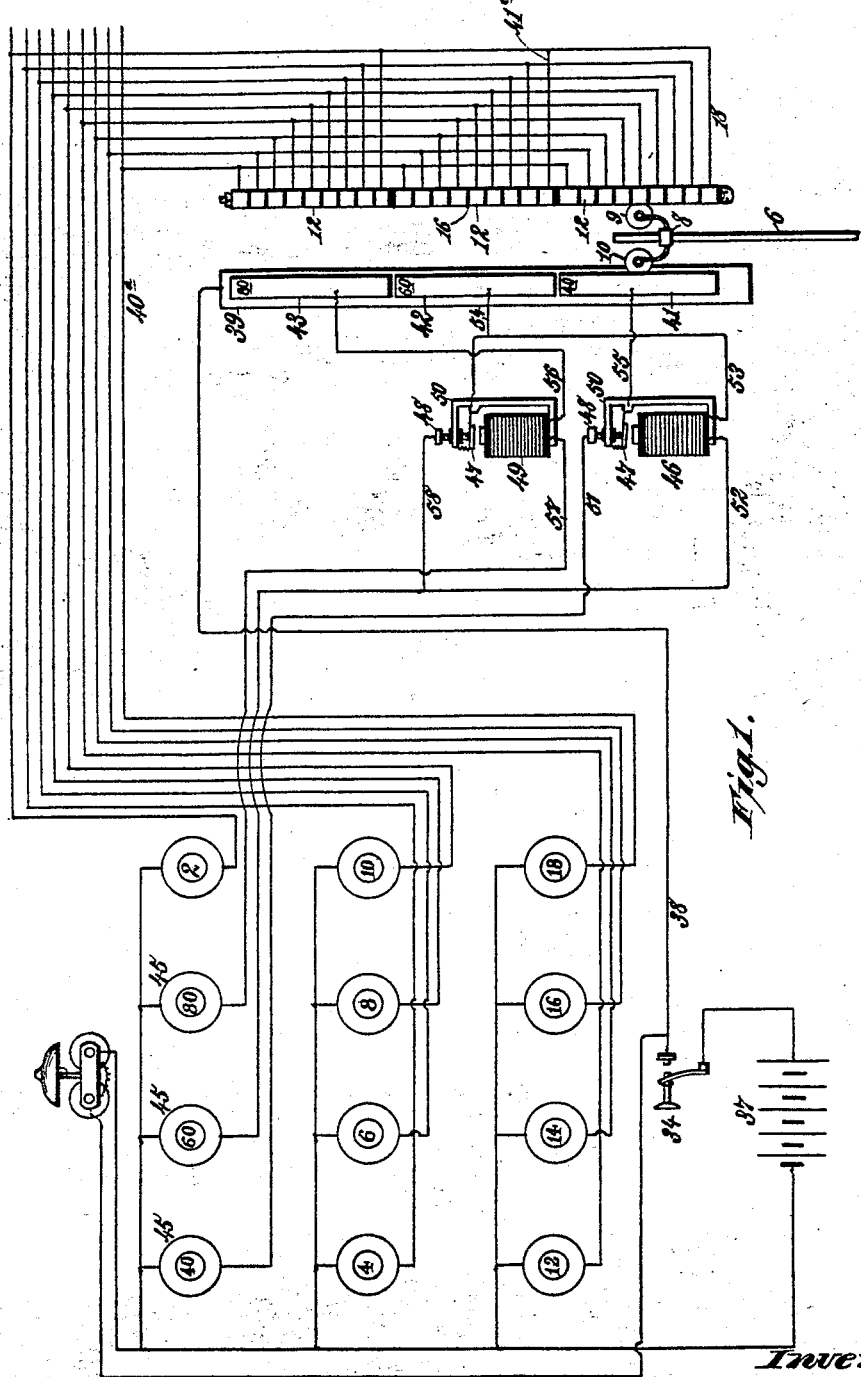

F. W. WIESEBROCK.
TELETHERMOMETER.

No. 455,268. Patented June 30, 1891.

Witnesses
Robert Everett.
J. A. Rutherford.

Inventor:
Frederick W. Wiesebrock.
By James L. Norris.
Atty.

F. W. WIESEBROCK.
TELETHERMOMETER.
No. 455,268. Patented June 30, 1891.
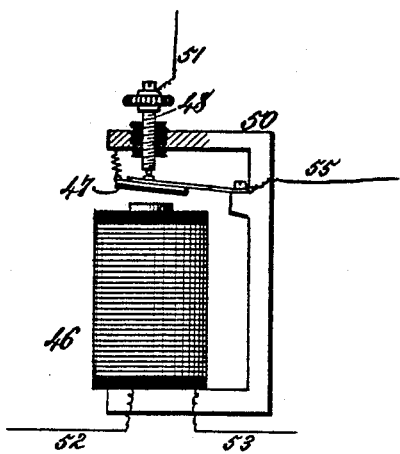
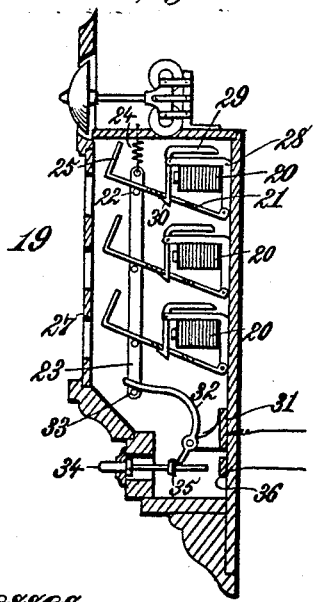
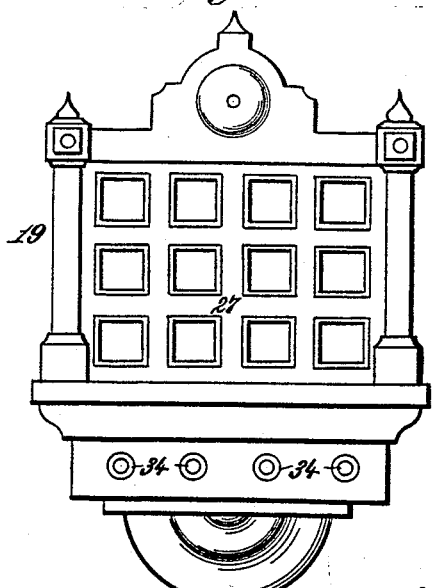
Witnesses:
Inventor:
Frederick W. Wiesebrock.

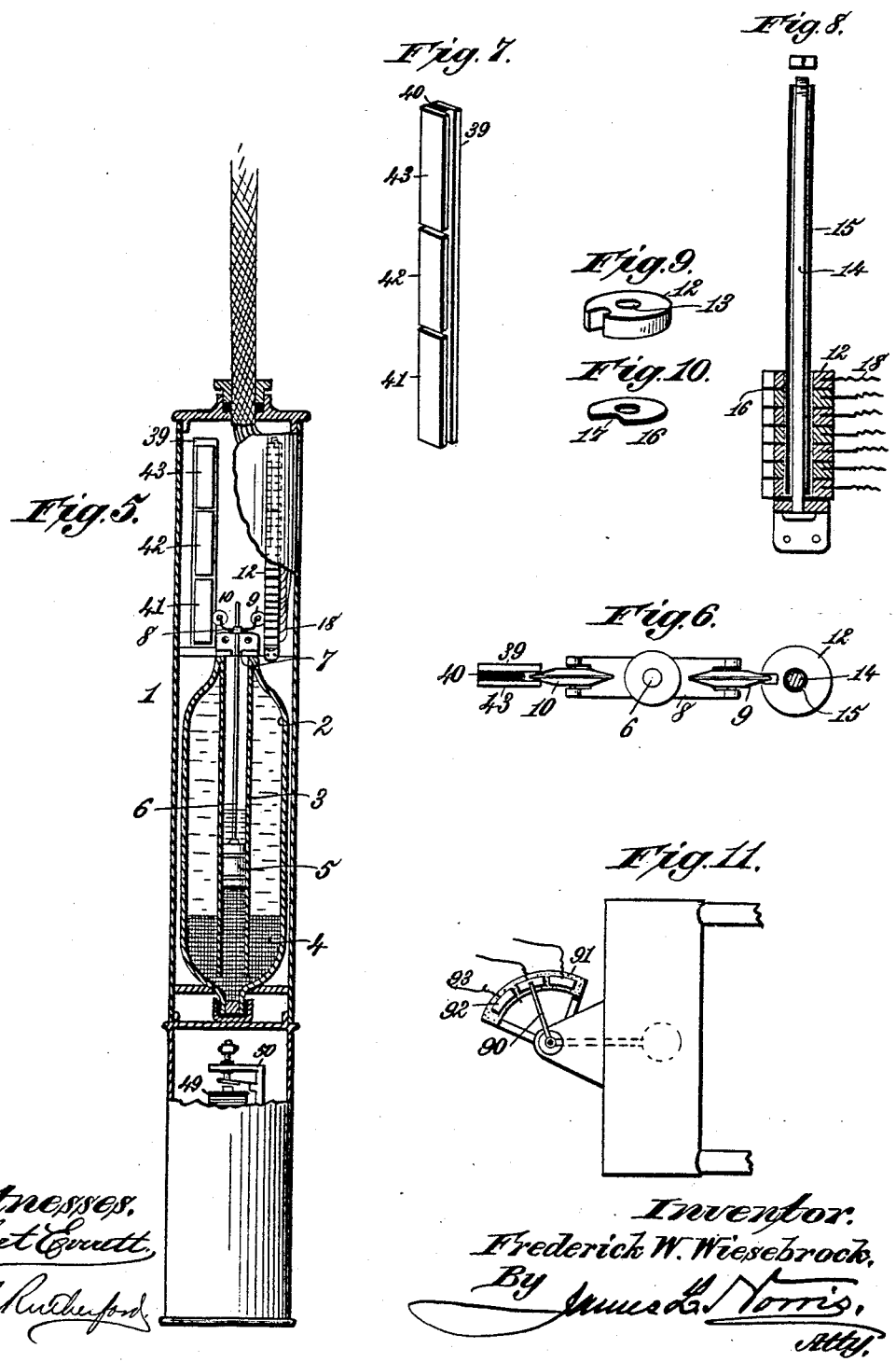

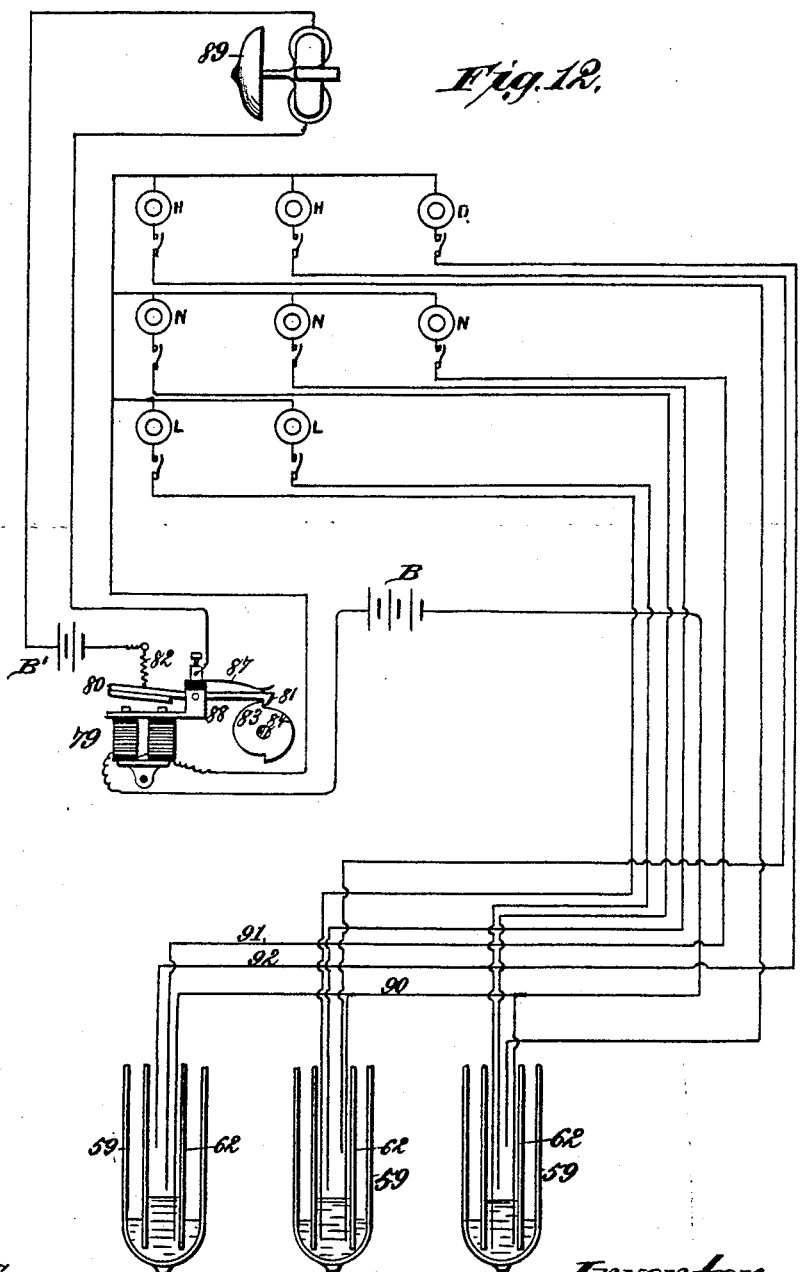

(No Model.) 5 Sheets—Sheet 5.
F. W. WIESEBROCK.
TELETHERMOMETER.
No. 455,268. Patented June 30, 1891.
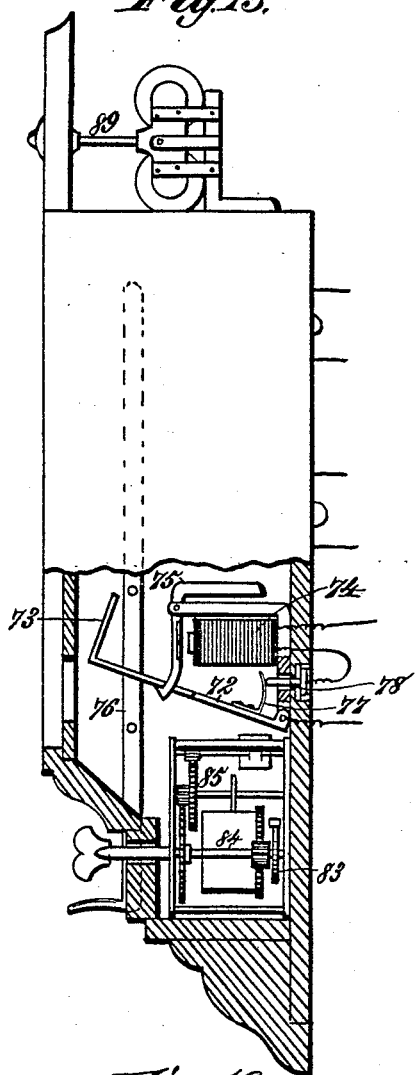
Fig. 13.
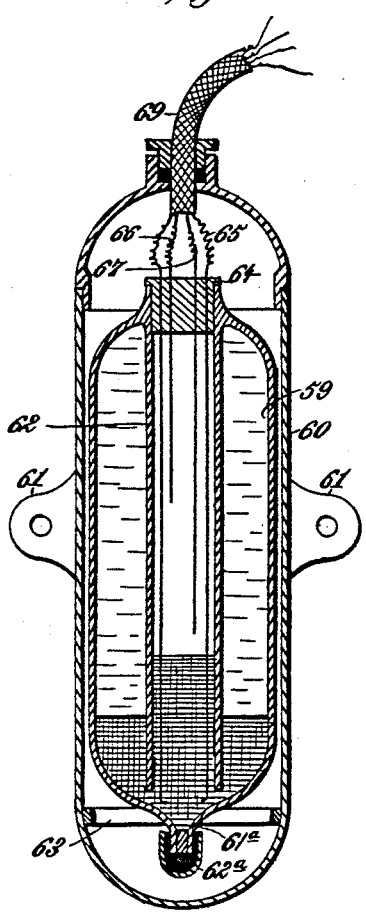
Fig. 14.
Fig. 15.
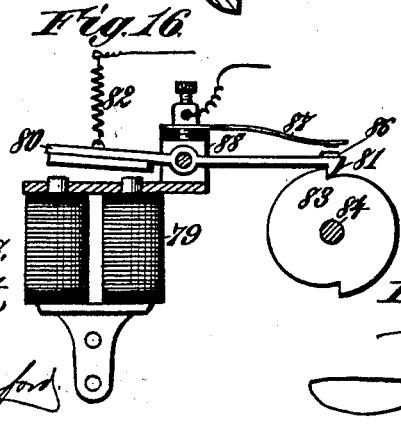
Fig. 16.
Witnesses.
Inventor.
Frederick W. Wiesebrock.
By James L. Norris.
Atty.

UNITED STATES PATENT OFFICE.

FREDERICK W. WIESEBROCK, OF NEW YORK, N. Y., ASSIGNOR OF ONE-HALF TO RICHARD M. BRUNO, OF SAME PLACE.

TELETHERMOMETER.

SPECIFICATION forming part of Letters Patent No. 455,268, dated June 30, 1891.

Application filed August 9, 1890. Serial No. 361,573. (No model.)

*To all whom it may concern:*

Be it known that I, FREDERICK W. WIESEBROCK, a citizen of the United States, residing at New York, in the county of New York and State of New York, have invented new and useful Improvements in Electric Distance Heat Indicators and Alarms, of which the following is a specification.

My invention relates to that class of thermoelectric alarms in which the presence of an abnormally high or dangerous temperature at any one or more of a series of points upon a circuit or series of circuits may be ascertained and shown at a central station or point, one type of such apparatus being shown in the application filed by me on the 31st day of August, 1889, Serial No. 322,513, said application having been allowed on the 3d day of March, 1890.

It is the purpose of the present invention to provide means whereby a reliable indication of the temperature actually existing at the time at any one of a series of separate points may be shown, through the agency of an electric current, at any instant desired, upon any suitable form of annunciator.

It is my purpose, also, to provide a thermoelectric apparatus so organized that it shall be capable at any moment of responding to a closure of the indicating circuit or circuits whereby the operative parts of the mechanism are preserved in working order, and the danger of adhesions caused by long periods of inaction is overcome or avoided.

It is my purpose, also, to provide a simple electrical apparatus and to combine therewith a thermometer of novel construction, whereby the existing temperature at any point located upon an established electrical circuit may be shown at any moment at a central station or point or indicated in degrees or fractions of a degree of a thermometric scale at each station or point.

To enable others skilled in the art to practice my invention, I will proceed to describe the same in detail, reference being had to the accompanying drawings, wherein—

Figure 1 is a diagram, partly in elevation, of one form of apparatus adapted to my said invention. Fig. 2 is a sectional elevation of one of the thermometric relays shown in Fig. 1. Fig. 3 is an elevation of one of the annunciators used in connection with said invention. Fig. 4 is a vertical section of Fig. 3. Fig. 5 is a sectional elevation of a thermometer constructed in accordance with my invention. Fig. 6 is a horizontal section of the thermometric instrument shown in Fig. 5. Fig. 7 is a detail perspective of the separate contact-plates shown in Figs. 5 and 6. Fig. 8 is a sectional elevation of the tie-rod for receiving the contact-plates of the thermometer or heat-measuring instrument. Fig. 9 is a detail perspective of the conducting-plates ringed upon the tie-rod. Fig. 10 is a similar view of one of the insulating-membranes interposed between the conducting-disks. Fig. 11 is a detail view of a modified form of the invention adapted for use in low-water alarms for steam-boilers. Fig. 12 is a view showing a modification in construction and in the arrangement of the circuits. Fig. 13 is a sectional view of a modified form of instrument used in connection with the apparatus shown in Fig. 5. Fig. 14 is a vertical section of the instrument shown in Fig. 6. Fig. 15 is a broken sectional view of a modified form of annunciator used in the modified arrangement shown in Figs. 5 and 6. Fig. 16 is a detail of the relay, releasing, and bell operating mechanism.

In the said drawings, the reference-numeral 1, Fig. 5, denotes the thermometric instrument, which consists of a casing of any suitable material, size, and shape inclosing a cylindrical shell of glass 2, from the neck of which depends the tube 3, substantially concentric with the shell 2 and having its open end depending nearly to the lower end of the shell. In the latter is placed a body of mercury 4, which lies also in the open end of the tube 3, and upon the surface of the mercury in said tube rests a float 5, upon which is mounted a stem 6, extending upward in the center of the tube 3 and passing out thereof through an opening 7. Upon the upper end of this stem is mounted a yoke-piece 8, having upon its two extremities contact-rolls 9 and 10. One of these rolls moves upon a pile or series of contact-pieces 12 (shown in Figs. 8 and 9) and having any suitable form, the preferred shape being substantially circular, each piece having a central opening 13, which receives a tie rod or bar 14, having an insulating-covering 15. Between each of the contacts 12 is placed a disk or plate 16, formed of rubber or other insulating material, and in the edges of the double series of contacts and insulating-plates I form notches or openings 17, in which the beveled edge of the contact-wheel 9 lies and moves as the float 5 rises and fails upon the surface of the mercury in the tube 3. To each of the insulated contacts 12 is connected a wire 18, leading to one of the electro-magnets of an annunciator, which is more fully described hereinafter. The electrical circuits will be set forth in their proper order.

The numeral 19 denotes an annunciator having three or more series of electro-magnets 20, each having the usual construction adopted in mechanism of this character. To give a more critical and exact description of these annunciators, attention is directed to Fig. 4, in which the drops 21 are shown as pivoted to the inner wall of the wooden casing and raised by pins 22, mounted on a rod or bar 23, which is supported upon the roof of the casing by a spring 24. Each of said drops is provided upon its outer end with a plate 25, of any suitable form and material, arranged at an angle with the supporting portion, whereby should any one of said drops be operated its plate 25 will be thrown down and any number of characters thereon shall be readily distinguished and read through the space ordinarily termed the "eye," which is composed of a frame 27, having openings through which said numbers or characters are displayed by the dropping of the plate 25. The openings or eyes may be of any number and arranged in any order or manner. I have shown in Fig. 3 of the drawings an annunciator in which the sight-openings are arranged in three different series, with four of such openings in each series. Suitably arranged in rear of each opening and mounted on the rear wall of the casing is one of the electro-magnets 20, said magnet being preferably arranged upon an angle plate or bar 28, the upper arm or member thereof overhanging and projecting beyond the outer ends of said magnet and giving support to an anchor 29, having a hooked end 30, which engages with and supports the drop 21 at the time that the magnet operating said anchor is brought into circuit. Upon a bracket 31, arranged below the series of magnets, is fulcrumed a bent lever 32, having its end engaged with a cross-pin 33 upon the lower end of the rod or bar 23. In the front wall of the annunciator are arranged a series of push-bars 34, having their ends engaging the power ends of the curved levers 32 and provided with collars 35, resting against the same, whereby as the bar is driven inward it will turn the lever 32 upon its fulcrum and draw the rod 23 downward. Immediately beneath the bracket 31 is a contact-plate 36, with which the end of the push-bar makes contact when pressed inward to a sufficient distance. The purpose of this arrangement will be set forth hereinafter.

Referring now to Fig. 1, let it be supposed that the numeral 37 represents a series of batteries of any suitable type—such, for example, as the Leclanche cells—and let the numeral 38 denote a wire leading from one pole of said battery or batteries to a conducting-plate 39, arranged in parallelism with the series of piled contacts 13. This plate may be mounted in the upper part of the casing of the measuring-instrument, as shown in Fig. 5. Connected with the conducting-plate 39, by means of an intermediate insulating-plate 40, are three conductors 41, 42, and 43, separated from each other, but so arranged that as the roll 10, having a beveled edge substantially similar to the edge of the roll 9, moves upward and downward it will make contact with the conducting-plate 39 and with the three separate plates 41, 42, and 43 successively. As each of the wires 18, connected to the lower series of nine contacts in Fig. 1, connect with the electro-magnets of the annunciator, it will be seen that the circuit is completed through the wire 38, plate 39, yoke 8, contact-wheels 9 and 10, one of the contacts 13, with which the contact-wheel 9 happens to be in engagement, one of the wires 18, one of the group of wires 40$^a$, the electro-magnet of the annunciator corresponding therewith, and thence by way of a return-wire from the other terminal of the magnet back to the other pole of the battery. It should be noted at this point that the instrument is arranged to operate upon an open circuit, and, therefore, in order to obtain any indication from any one of said instruments, the circuit must be closed by a push-button or other equivalent device 34.

To make the operation of the annunciator shown in Fig. 1 more clear, let it be supposed that by the rise of the mercury 4 in the tube 3 the float 5 has risen far enough to bring the contact-wheel 9 into contact with the piece 12, Fig. 8, corresponding with the indication of 10° on Fahrenheit scale. As the circuit is closed by operating the push-button 34, electricity flows over the wire 38, through the plate 39, contact 9 and 10, and thence by way of the wire 18, connected with the fifth contact of the lower series 12, to the fifth wire of the group 40$^a$, and then to the magnet of the annunciator having the drop-plate which shows the degrees or bears such characters as gives the indication corresponding with the fifth contact. The course of the current is similar until the last contact in the lower series of contact 12 has been reached by the contact-wheel 9. The last member of said series being equivalent to an indication of 18° of temperature, or 2° for each contact 12, it is now desirable to switch in an indicating-drop corresponding with the twentieth degree and then obtain the succeeding indications up to thirty, forty, &c., by a duplication of the lower series of contacts, which are insulated from the first series but connected to the group of wires 18 by the wires 41ᵃ.

In the annunciator-casing I arrange a suitable number of drop-plates, which are indicated in Fig. 1 by the numeral 45, and are operated substantially in the same manner as those already described. These drop-plates are numbered 20 30 40 or 40 60 80, as circumstances may require and according to the range of indications.

At any suitable point I arrange a relay-magnet 46, having a spring-raised armature 47, which is thrown when the circuit is open against a back-stop 48. In suitable proximity to this relay I arrange a second and similar relay 49, each having a yoke 50, supporting the armature and back-stop.

To the back-stop of the first relay-magnet 46 is attached a wire 51, leading to the magnet of the first of the three drops 45, which have a figure by which the numerical succession between the first and second series of contacts 13 is established. From one coil of the relay-magnet 46 a wire 52 is led to the magnet of the second drop-plate 45, while from the other coil a wire 53 is led to the yoke 50 of the second relay 49, where it is so arranged that it is in electrical connection with the spring-raised back-stop 48. This wire also has a branch connection 54 with the second one of the contact-plates 42, and by a wire 55 the armature of the first relay 46 is connected with the first contact-plates 41. The connections from the second relay are by a wire 56, leading from one coil of the magnet 49 to the third contact 43, while from the other coil a wire 57 is carried to the magnet of the third drop-plate 45. A wire 58 connects the back-stop of the relay 49 with the wire 52. Let it be supposed now that the minimum temperature to be indicated is 40° and that the parts are in the position shown in Fig. 1. If now the push-button identified with any one of the separate instruments shown in Fig. 5 be operated, the circuit will be closed over the path already described, and will also be established by wire 38, plate 39, through contact-wheel 10, insulated plate 41, wire 55 to armature 47, back-stop 48, wire 51 to magnet of drop-plate having the figure 40, and thence back to the battery, releasing said drop-plate. This will read, therefore, 40° upon one drop-plate and 10° upon the other, or a total of 50°. If now the float rises farther until the contact-wheels 9 and 10 pass upon the second intermediate series of contacts 13, the contact-wheel 10, in passing off the lower plate 41, breaks the circuit of the magnet of the drop carrying the figure 40, thereby restoring said drop-arm. At the same time the circuit shifts as follows: From one pole of the battery by wire 38 to plate 39, contact-wheel 10, intermediate central plate 42, wire 54 and 53, armature 47, back-stop of magnet 49, wire 58, wire 52 to the magnet of the second drop, and thence back to the battery 45. Now as the mercury rises the wheels 9 and 10 will ride upward, and as the wheel 9 makes a contact successively with the second series of contacts 13, by wires 41ᵃ to the wires 18, the drop-arms of the annunciator already described will be successively operated, their indications 2 4 6 et seq. being thrown down one after the other. When the contact-wheels 9 and 10 rise to the third contact-plate 43, the circuit is by way of wire 38, plate 39, plate 43, wire 56, magnet 49, breaking contact between the back-stop and armature 47, to the magnet of the third drop-arm 45, and thence to the other pole of the battery. At the same time the drop-arm exhibiting numeral 40 is retained out of sight, as the circuit is cut off from the lower relay the instant that the contact-wheel 10 passes from plate 42 to plate 43.

It will be noted that in the diagram in Fig. 1 there is a split in the circuit at the point where the wire 54 unites with wire 53. The purpose of this is as follows: In the passage of the wheel 10 from the plate 41 to the plate 42 there is a movement of greater or less duration, when contact will be had with both, thereby bringing them into conduction with plate 39 and simultaneously energizing the magnets of both the drop-arms, which throw down and exhibit the numbers 40 and 60. To prevent this I use the split shown, whereby the current will be partly diverted over wire 54, wire 53, through the coils of the magnet 46, and by wire 52 through the first drop, and thence back to battery, breaking the circuit between armature 47 and back-stop 48. The instant wheel 10 leaves plate 41 the armature is raised by its spring into position for the next successive operation.

I have shown in Fig. 11 a simple automatic device for indicating the temperature in buildings, ships, and similar places. It consists of a movable contact-needle 90, turning upon a segment 91, having two or more contact-points 92, corresponding with "High" and "Low" at the instrument. Each point is connected by a wire 93 with the thermal instrument, and the needle is connected with the other pole of the battery, which operates a call or other signal.

In cases where the apparatus is used to indicate a few degrees of temperature, or to denote the difference between the high and low or high and low and normal, as the case may be, and especially in that type of these instruments used in ship-holds or in localities where it is essential that constant information be had of the thermal condition existing at such points, I provide the apparatus shown in Figs. 12 to 16, both inclusive.

In Figs. 14 and 15 I have shown the modified form of thermometric instrument, the same consisting of an enlarged outer tube 59, of any suitable material, inclosed within a circular or cylindrical casing 60, which is provided with lugs 61, by which it may be fastened in place upon a wall or other support. The outer tube 59 incloses an oval smaller tube 62, which is inserted within or formed upon the central neck of the outer tube and drops therein nearly to the bottom of the latter, its lower end being open. The outer tube 59 is supported by a bridge 63 and provided with a nozzle 61ª for filling, which is afterward sealed by a cap 62ª and a plug. In the outer tube is placed a body of mercury, lying partly in each, and in the outer tube is a quantity of fluid having a suitable expansion and a less specific gravity than mercury—such, for example, as alcohol. In the neck of the tube is inserted a stopper 64, of any insulating material, through which pass wires 65, by which the current is conveyed, one of said wires denoting the low point, and wires 66 67, the first being terminated at the danger-point, the second at the point of normal temperature, while the low point is indicated by one of the wires 65. These wires are united in a cable 69, and are packed through a stopper 64 in the mouth of the inner vessel 59, the cable being passed through a plug in the mouth of the outer vessel, making a hermetical seal. When used as a fire-alarm, I may dispense with the wire indicating normal temperature and use the high and low contacts only.

Fig. 13 is a broken sectional view of a form of annunciator adapted for use in combination with these instruments and having drop-arms 72, with plates 73 carried thereby, which may have the words "High," "Low," or "Danger," "Low," and "Normal," or other characters displayed thereon. These arms are operated by the electro-magnets 74, through the anchors 75, in the same manner as that already set forth in connection with Fig. 4, a lift 76 being provided to restore the drop-arms to their connection with the anchors. Each drop-arm 72 is provided with a spring contact-plate 77, whereby the circuit of the magnet corresponding with said drop is always normally closed at the point where said spring-contact impinges upon a contact-point 78, corresponding substantially to the push-button shown in Fig. 4. Thus whenever the mercury is driven up in the inner or smaller tube until it makes contact with one of the wires depending therein the electro-magnet of the annunciator corresponding with said wire draws on the anchor and releases the drop-arm having the corresponding indication thereon. At the same time the current is caused to traverse the coils of the magnet 79 and attract the armature-lever 80, having a hook 81 upon its end, which is normally depressed by the spring 82 and brought into engagement with a notched disk 83, mounted on a shaft 84, which is rotated by a train of clock-gearing 85. As the lever is raised out of the notch in the disk a contact 86 upon its back makes engagement with a spring-plate 87, mounted on and insulated from the bracket 88, which forms the fulcrum of the armature-lever, thereby closing the circuit of an electric bell 89. This ringing continues until the revolution of the disk permits the hooked end of the armature-lever to drop into the next notch.

In Fig. 12 I have shown the circuits pertaining to this type of apparatus. In said figure the thermometric instruments are represented as open for the sake of convenient illustration, the contact-wires being arranged in the inner tube in the manner already set forth. To each of these contacts is connected a wire 90, leading from the low contact, a wire 91, leading from the normal contact, and a wire 92, leading from the high or danger contact. The wire 90 is connected to each of the low contacts in the instruments and then carried to one pole of the battery B, thence from the other pole to one terminal of the electro-magnet 79, and from the other pole thereof to the several connections 91, leading to the magnets of the annunciator, and thence back to the next succeeding contacts in the instruments. A separate battery B' is used to supply the bell-circuit. The arrangement of these circuits is so simple that no further description is needed beyond that already given. By the arrangement of the lift, which restores all the drop-arms to place, the circuit of each thermometer is closed, and all the drop-arms actuated by wires which touch the ascending columns of mercury in the instruments will at once fall down again, and the bell will again be sounded, and the action of the clock-work will be repeated. As one wire contact, either "low" or "normal," is always in contact with the mercury in each instrument, the operative character or condition of the apparatus is always visible.

What I claim is—

1. In an electric apparatus for indicating the thermal changes at a series of distinct and separated points, the combination, with an annunciator having a series of drop-arms, each of which carries a plate having a character or numeral identified with one of said points, of a series of thermometric instruments arranged at said points, a series of electric circuits, each being normally open at two points, said circuits connecting each of the heat-measuring instruments with the magnet of that drop-arm having a plate identified with the point where said instrument is placed, a contact in each instrument whereby the circuit is closed at one of the open points by the rise of the mercury column until it touches said contact, and push-buttons mounted upon the annunciator and adapted to engage a contact-plate, whereby the second open point in said circuit is closed, substantially as described.

2. In an electric apparatus for indicating thermal changes at one or more distant points, the combination, with an annunciator having a series of drop-arms, each carrying a plate having a character or symbol denoting the rise of temperature at the point identified with said plate, of one or more thermometric instruments arranged at the point or points specified, an electric circuit for each instrument, formed by a wire in constant connection with the mercury and with one pole of the battery and one or more circuit-completing wires having their points arranged at a different height, an electro-magnet to attract the anchor sustaining the drop-arms of the annunciator, one terminal of said magnet being connected to the circuit-completing wire and the other terminal to the second pole of the battery, means for making and breaking the circuit at the annunciator, a bell-circuit closed by the closing of the thermometric circuit, and a device, substantially as described, revolved by gearing to break the bell-circuit, substantially as described.

3. In an electric apparatus for indicating thermal changes, the combination, with an annunciator having a drop-arm carrying a plate having a character or symbol denoting the rise in temperature at a distant point, of a thermometric instrument arranged at said point, a circuit for said instrument, formed by a wire having one end in constant electrical communication with the mercury in said instrument and the other end carried to one pole of a battery, an electro-magnet to release the anchor sustaining the drop-arm, to one terminal of which magnet said wire is connected, the other terminal being connected to the other pole of the battery, an electro-magnet interposed between and connected with said terminal and pole, a circuit closing and breaking lever operated by the latter electro-magnet, a notched disk normally engaged and arrested by one end of said lever, a train of gearing revolving said disk when released, and a bell-circuit closed at the release and broken at the arrest of said disk, substantially as described.

4. In an electric apparatus for indicating thermal changes at any distant point, the combination, with an annunciator having a series of drop-plates having numerals denoting the successive increase up to a given point, of electro-magnets operating the arms carrying said plates, two or more groups or series of insulated contacts arranged in line, each contact in the first group corresponding to one or more degrees of a heat-measuring scale, a series of wires connecting the contacts of the first series to magnets releasing the drop-arms of the annunciator-plates, one or more groups of wires connecting the contacts in the successive series to the wires of the first series, a wire connecting the other terminals of said magnets to one pole of the battery, a conducting-plate parallel with a series of contacts, a series of conductors mounted on and insulated from the conducting-plate, each conductor corresponding in length with one series or group of the contacts opposite to which is arranged a conducting-yoke having contact-wheels, one of which rolls upon and is in electrical contact with both the conducting-plate and the conductors thereon, while the other rolls on the series of insulated contacts, a heat-measuring instrument raising and lowering the yoke by the expansion and contraction of the mercury, a relay having its spring-raised armature and back-stop electrically connected to the conductor opposite the first series of contacts and to the first one of a separate series of annunciator-plates bearing numerals denoting successive multiples of ten, a second relay having its back-stop and spring-raised armature electrically connected to the second of the separate series of annunciator-plates, to one coil of the magnet of the first relay, and by a branch to the second conductor, one coil of the second relay being connected to the magnet of the third one of the separate series of annunciator-plates and the other coil to the third insulated conductor, one coil of the first relay-magnet being electrically connected to the back-stop and spring-raised armature of the second relay and by a branch to the second insulated conductor, and the other coil to the second of the separate series of annunciator-plates, and a wire completing the circuit from the second pole of the battery to the conducting-plate, substantially as described.

5. In an electric apparatus for indicating thermal changes at one or more distant points, the combination, with an annunciator having a series of drop-plates, each identified with one of said points, of a series of electro-magnets operating the arms moving said plates, a series of circuits, each connected with one of a corresponding series of contacts, each representing a rise in temperature of a definite number of degrees on a thermal scale, and each connected also with the magnet of one of the drop-arms of the annunciator, a series of conducting-plates insulated from each other, a conducting-yoke raised and lowered by the rise and fall of the mercury column and having its opposite ends in electrical contact with the series of contacts and conducting-plates, a series of circuits for the former and separate circuits for the latter, leading to corresponding drop-plates in the annunciator, a relay interposed in the circuit from one of the conducting-plates through the back-stop of said relay and by a split to the electro-magnet of one of the drop-plates and the second terminal of the other relay, a circuit from the next plate by a split to the back-stop of first relay and the first terminal of the second relay through the magnet of a separate drop-plate, and a switch closing the circuit, substantially as described.

In testimony whereof I hereunto affix my signature in presence of two witnesses.

FREDERICK W. WIESEBROCK.

Witnesses:
ROBT. M. JOHNSTON,
RICHARD M. BRUNO.